United States Patent [19]

Linsbauer et al.

[11] Patent Number: 5,676,115
[45] Date of Patent: Oct. 14, 1997

[54] WORK APPARATUS HAVING AN INTERNAL COMBUSTION ENGINE

[75] Inventors: Peter Linsbauer, Remshalden; Norbert Veser, Weinstadt, both of Germany

[73] Assignee: Andreas Stihl, Waiblingen, Germany

[21] Appl. No.: 512,158

[22] Filed: Aug. 7, 1995

[30] Foreign Application Priority Data

Aug. 5, 1994 [DE] Germany ............... 44 27 738.5

[51] Int. Cl.⁶ .................................................. F02M 37/04
[52] U.S. Cl. ........................... 123/516; 220/746; 137/589
[58] Field of Search ................................. 123/516, 514; 137/589; 125/13.01, 12; 220/746, 749, 89.1

[56] References Cited

U.S. PATENT DOCUMENTS

| | | | |
|---|---|---|---|
| 1,351,259 | 8/1920 | Maschek et al. | 137/589 |
| 3,372,679 | 3/1968 | Aitken | 220/746 |
| 4,416,108 | 11/1983 | Ghandhi | 220/749 |
| 4,646,701 | 3/1987 | Fukumoto | 123/516 |
| 5,116,257 | 5/1992 | Szlaga | 137/589 |
| 5,186,220 | 2/1993 | Scharrer | 137/589 |
| 5,381,919 | 1/1995 | Griffin | 220/89.1 |
| 5,515,891 | 5/1996 | Langlois | 220/746 |

FOREIGN PATENT DOCUMENTS

| | | | |
|---|---|---|---|
| 2415177 | 10/1975 | Germany | 123/516 |
| 2440397 | 3/1976 | Germany | 220/746 |
| 0067960 | 4/1983 | Japan | 123/516 |

*Primary Examiner*—Carl S. Miller
*Attorney, Agent, or Firm*—Walter Ottesen

[57] ABSTRACT

The invention relates to a cutoff machine having an internal combustion engine arranged for driving a work tool. The engine is held in a housing including a supporting component. Located in the housing is a fuel tank, from which the internal combustion engine is supplied with fuel. The fuel tank itself is connected via a venting tube to an equalizing vessel, which communicates with the atmosphere via a valve system. In order to connect the fuel tank to the equalizing vessel in an easily produced and assembled manner and in order to ensure safe venting of the fuel tank, a hollow body is provided in the supporting component. The hollow body is partitioned by a partition wall into two chambers, the one chamber forming the fuel tank and the other chamber forming the equalizing vessel. Both chambers are connected to each other via a one-piece venting component in which a venting line is formed.

17 Claims, 3 Drawing Sheets

WORK APPARATUS HAVING AN INTERNAL COMBUSTION ENGINE

FIELD OF THE INVENTION

The invention relates to a handheld portable work apparatus such as a cutoff machine or the like.

BACKGROUND OF THE INVENTION

Work apparatus of this kind are generally known. Especially in the case of cutoff machines, venting the fuel tank and supplying air thereto is necessary for the equalization of pressure and is not without danger, since at the time of the cutoff work, it is not normally possible to prevent a spark from flying. Fuel which leaks in an uncontrolled manner or fuel vapors which escape in an uncontrolled manner can easily be ignited by the flying spark. This represents a considerable potential danger for the environment and not least for the operator.

It is known to vent the fuel tank of handheld portable work apparatus via an equalizing or compensating vessel. The fuel tank and the equalizing vessel are separate injected plastic parts, which are arranged within the housing of the work apparatus and communicate with each other via a tube connection. The tube connection between the fuel tank and the equalizing vessel must be guided so that both an air-tight and liquid-tight connection to the equalizing vessel is ensured. In addition, the equalizing vessel requires an air-tight and liquid-tight connection to the valve system, via which the pressure-equalizing takes place.

This known system has proved successful in practice, but has a number of possible leakage points. Thus, on the one hand, careful and therefore time-consuming assembly is necessary and, on the other hand, when working within the housing of the work apparatus, care must be taken that the tube connections laid there are not damaged or even torn from their connectors.

SUMMARY OF THE INVENTION

It is an object of the invention to provide a work apparatus of the above type, which is driven by an internal combustion engine, with a fuel tank with an equalizing vessel in a technically simple and easy to assemble manner in order to ensure safe venting and supplying of air to the fuel tank.

The handheld portable work apparatus of the invention is, for example, a cutoff machine or the like. The work apparatus includes: a housing; a tool mounted on the housing; an internal combustion engine mounted in the housing for driving the tool; the housing having a supporting component defining a hollow body having a partitioning wall separating the hollow body into a first chamber defining a fuel tank and a second chamber defining a compensating vessel; the engine being connected to the fuel tank from which fuel is supplied to the engine; a one-piece venting component defining a venting line interconnecting the compensating vessel and the fuel tank; and, a valve system connecting the compensating vessel to the ambient atmosphere.

The fuel tank and equalizing vessel lie directly adjacent to each other and are constructed in one piece with the supporting housing component. The spatial proximity affords the advantage that the necessary connections between the fuel tank and the equalizing vessel can be provided in one venting component. This preferably one-piece venting component can be securely connected to the hollow body so that during operation as well as at the time of maintenance work on the machine, a pulling or tearing off of tubes is avoided. Since all the connecting tubes are contained in the one-piece air venting component, rapid assembly is ensured.

The venting component is preferably mounted outside of the hollow body so that its tightness can be inspected visually at any time. If leakages occur, the venting component and associated sealing elements can be exchanged without significant disassembly.

In one embodiment of the invention, an assembly opening for the venting line is provided in the fuel tank and an assembly opening for the valve system is provided in the equalizing or compensating vessel. Both assembly openings lie closely adjacent to each other on one side facing toward the interior of the housing of the work apparatus. The venting line is guided through the assembly opening of the valve system into the equalizing vessel. Because of the close proximity of the assembly openings, the venting component can be kept small in size and the venting connection between the fuel tank and equalizing vessel can be provided. The valve system is preferably integrated into the venting component, so that all the installation work is carried out when the venting component is fitted to the assembly openings.

The connecting stubs of the venting component project into the assembly openings and are advantageously held in the assembly openings in sealing collars. The sealing collars are advantageously constructed in one piece with a common flat seal which is disposed between the venting component and the outer wall of the hollow body. The sealing collars projecting into the assembly openings simultaneously position the flat seal so that even for unskilled persons a correct assembly is possible. If the assembly openings are configured to have different diameters, a correct association of the sealing collars with the chambers is also ensured.

In order to ensure a reliable retention of the venting component on the hollow body without further fixing measures, at least one sealing collar is snapped into an assembly opening and the connecting stub projecting through the sealing collar is configured so that it engages the sealing collar from below in the chamber.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
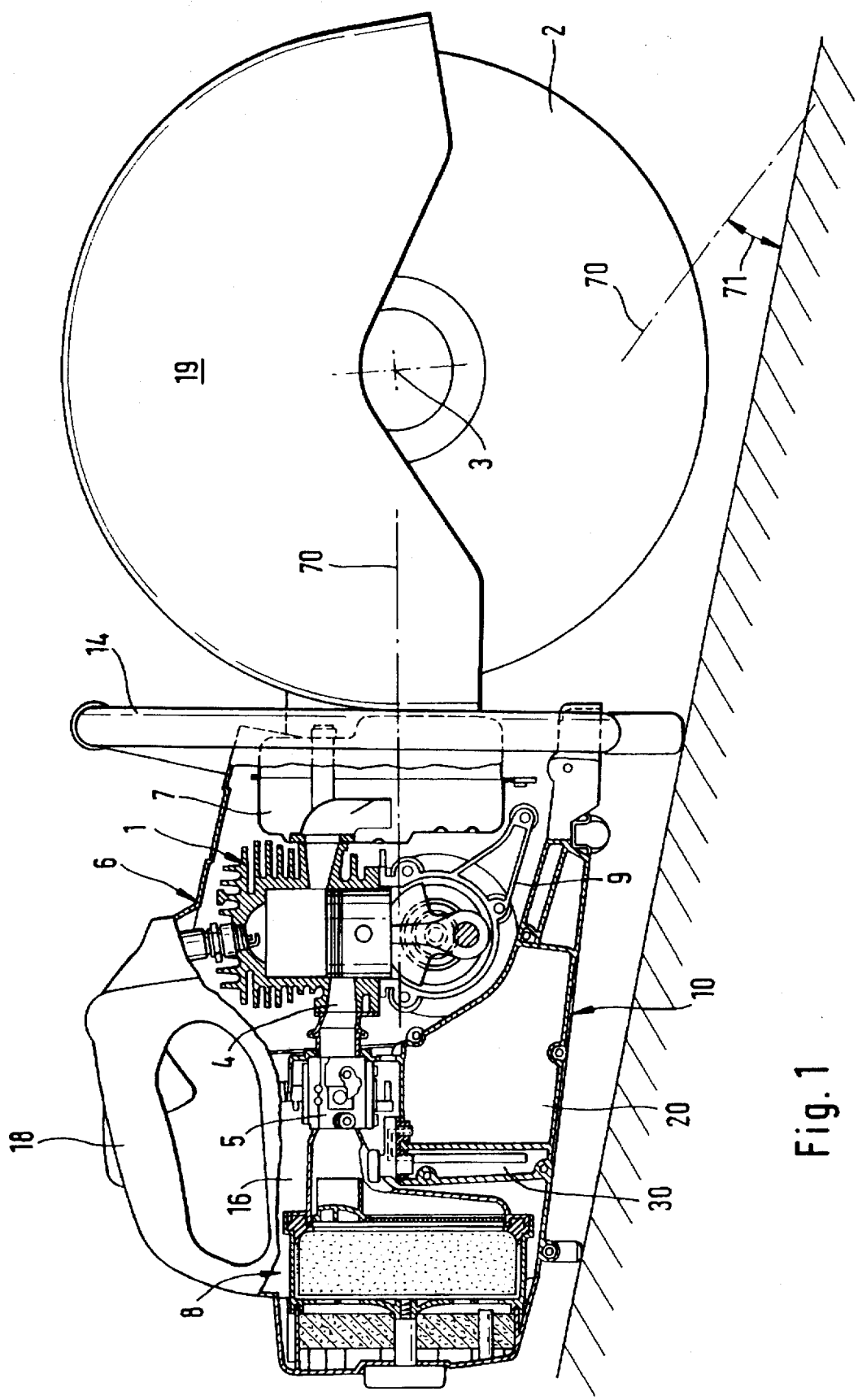
FIG. 1 is a side elevation view of a cutoff machine with a portion of the housing wall broken away.

The handheld portable work apparatus shown in FIG. 1 is a cutoff machine. Cutoff disc 2 is provided as the working tool and is rotationally driven about a horizontal axis 3 by an internal combustion engine 1. The internal combustion engine 1 is mounted within a housing 6. The exhaust of the engine with the muffler 7 mounted thereon faces the cutoff disc 2; whereas, the inlet channel 4 is connected to a carburetor 5 on the side facing away from the muffler 7. Combustion air is supplied to the carburetor 5 via an air filter 8 such as a multistage air filter.

Fuel is supplied to the carburetor 5 from a fuel tank 20 located below the carburetor 5. The fuel tank 20 fills out a free space between the air filter 8 and the crankcase 9 of the internal combustion engine 1. The fuel tank 20 is provided in a supporting component 10 of the housing and this component extends below the carburetor 5 and the crankcase 9. A forward handle 14 is attached to the end of the housing component 10 and faces toward the cutoff disc 2. The handle 14 preferably extends around the housing and defines approximately a plane, to which the longitudinal center axis of the cutoff disc 2 is perpendicular. For the protection of the operator, the cutoff disc 2 rotates in a cover 19, which extends over a peripheral angle of the approximately 200°.

A handle 18 is aligned in the longitudinal direction of the cutoff machine on the upper side of the housing 6 lying opposite the supporting component 10. The handle 18 extends from the air filter 8 approximately to the cylinder of the internal combustion engine 1.

Figure 2:
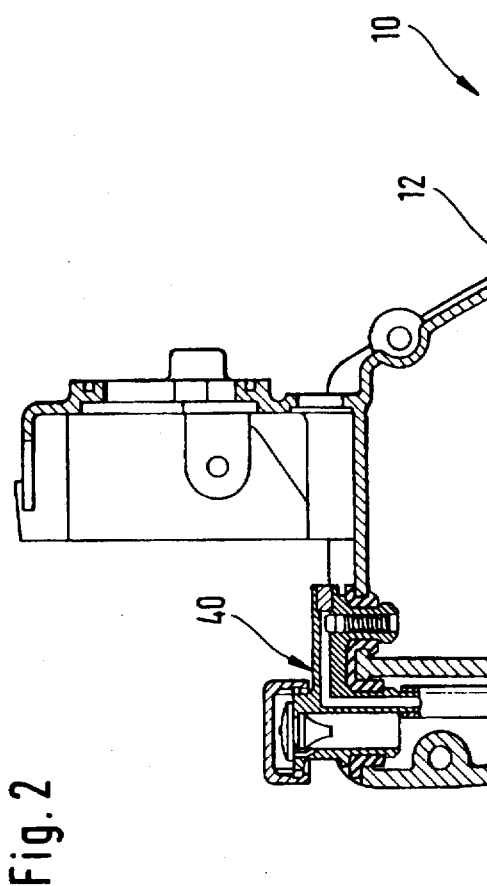
FIG. 2 is an enlarged view of a supporting component of the housing incorporating the compensating vessel and fuel tank together with the venting component.

The supporting component 10 extends approximately from the cutoff disc 2 below the muffler 7 to below the air filter 8 and is shown enlarged in FIG. 2. The housing component 10 is advantageously an injected plastic part, which is partitioned in the longitudinal direction of the machine. A configuration as a die cast part is also advantageous, in which case magnesium or a magnesium alloy is preferably used as the material. A hollow body 12 is configured between the ends of the supporting component 10. The hollow body 12, as shown in FIG. 1, is configured to fit the available space between the air filter 8, carburetor 5 and engine 1. This hollow body 12 is subdivided by a partitioning wall 11 into chambers 23 and 33, which, in the embodiment shown, have different volumes. The partitioning wall 11 is preferably configured as one piece with the housing component 10. The larger chamber 23 preferably forms the fuel tank 20, whereas the chamber 33 having the smaller volume forms an equalizing or compensating vessel 30. The equalizing vessel 30 extends at right angles to the longitudinal center axis of the work apparatus in front of the fuel tank from one side face of the housing component 10 to the other side face thereof.

Figure 3:
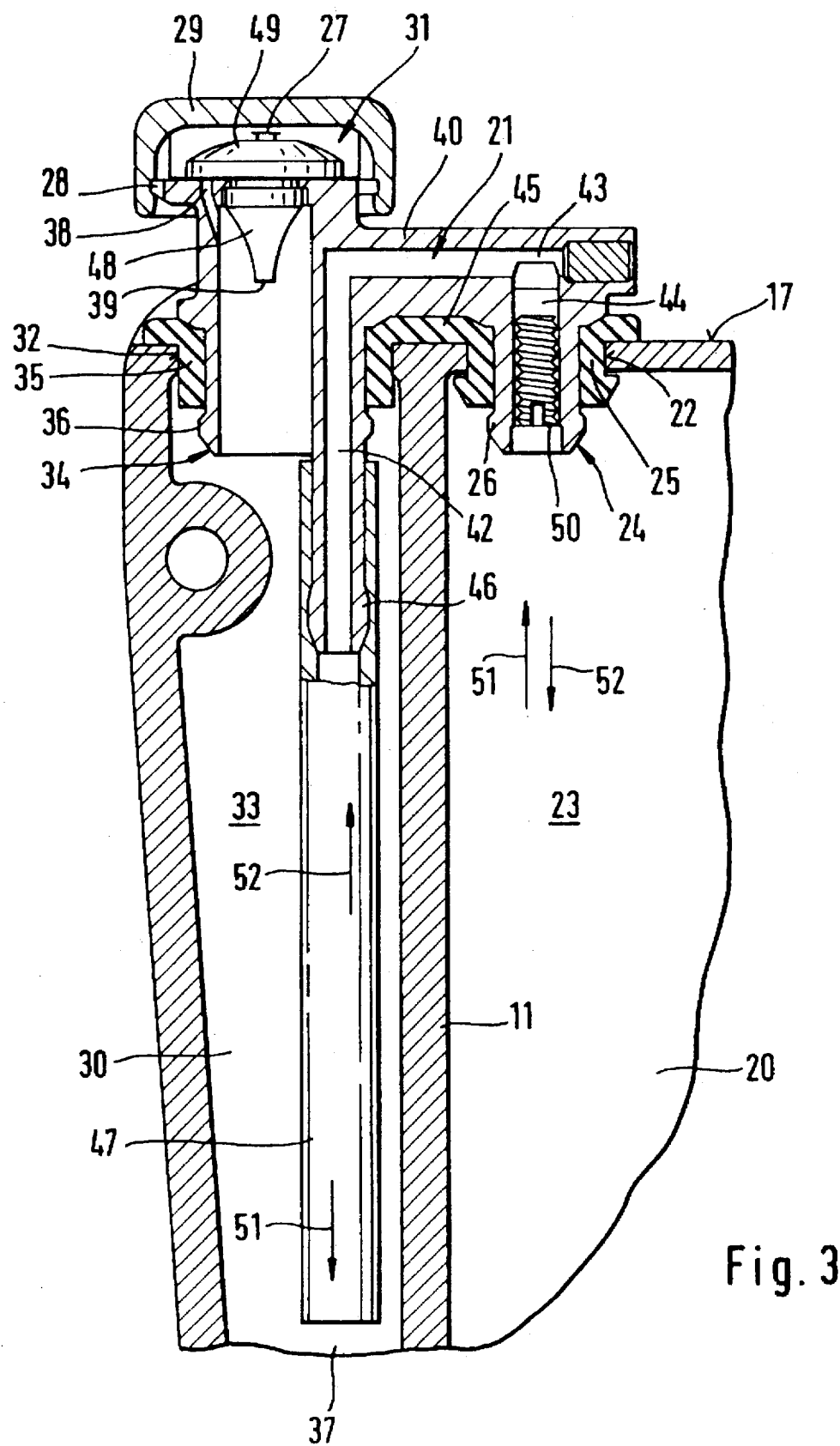
FIG. 3 is an enlarged view of the venting component.

As shown in particular in conjunction with FIG. 3, an assembly opening 22 for a venting line 21 is provided in the wall of the housing component 10 delimiting the fuel tank 20. In a corresponding manner, an assembly opening 32 is provided in the wall of the housing component 10 delimiting the equalizing vessel 30. The venting line 21 from the fuel tank 20 is guided through this assembly opening 32 into the equalizing vessel 30. The assembly opening 32 furthermore serves for the connection of the valve system 31, by which the equalizing vessel 30 is vented and supplied with air. Both assembly openings 22 and 32 lie in close proximity to each other on a side 17 of the hollow body 12 facing the interior space 16 of the housing 6. In the embodiment shown, the two assembly openings 22 and 32 are at a distance apart, which is slightly greater than the thickness of the partitioning wall 11.

The assembly openings 22 and 32 serve to mount a venting component 40 which connects the fuel tank 20 and the equalizing vessel 30 to each other. The U-shaped venting line 21 is configured in the venting component 40 by three channels 42 to 44. The first channel 44 leads through the assembly opening 22 upward into the connecting channel 43 which establishes the connection to the channel 42. The channel 42 projects downward through the assembly opening 32 into the equalizing vessel 30. This channel 42 ends in a connecting stub 46 onto which a tube segment 47 is fitted. The tube segment 47 projects down into the bottom region 37 of the equalizing vessel 30. The valve system 31 is also mounted on the venting component 40 and is connected to the equalizing vessel 30 via a further connecting stub 34 which projects through the assembly opening 32. The venting channel 42, which connects into channel 43, is also configured in the further connecting stub 34.

A double-acting valve in the manner of a combined mushroom/duckbill valve (48, 49) is mounted in the end of the connecting stub 34 remote from the equalizing vessel 30. The valve member of the mushroom valve 49, which is configured in the manner of a mushroom, covers a venting opening 38. The duckbill valve 48, mounted in the center of the mushroom valve 49, lies with its valve opening 39 so that this opening faces the interior of the connecting stub 34 and the equalizing vessel 30.

Sealing collars (25, 35) are mounted in the assembly openings (22, 32), respectively. The sealing collar projects into the assembly opening 22 of the fuel tank 20 and is snap connected into the assembly opening 22. The assembly opening 22 has a smaller diameter than the diameter of assembly opening 32. Both sealing collars (25, 35) are configured in one piece with a flat seal 45, which rests on the outside 17 of the hollow body 12 and serves as a sealing member between the venting component 40 and the hollow body 12.

After inserting or snap connecting the sealing collars 25 and 35, the flat seal 45 rests securely on the outer side 17 of the hollow member 12. The venting component 40 is pushed with the connecting stubs 24 and 34 into the corresponding sealing collars 25 and 35 until the venting component 40 is connected in a liquid-tight and especially also gas-tight manner to the hollow member 12. In this position, the connecting stubs 24 and 34 extend through the sealing collars 25 and 35, respectively. The connecting stubs have respective ends projecting from the sealing collars. Beads 26 and 36 are formed on corresponding ones of the ends and enlarge the outer diameter of the corresponding stub. The beads (26, 36) engage behind the respective sealing collars (25, 35) so that the venting component 40 is secured in its mounted position. The sealing collar 25 snap connected into the assembly opening 22 forms a seal-tight interlock which ensures undetachable mounting of the seal and of the venting component 40.

Figure 4:
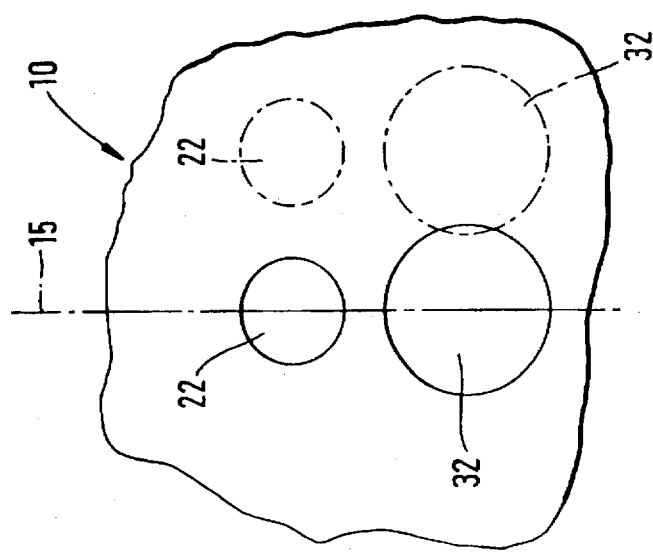
FIG. 4 is a detail plan view of the supporting component with a partition plane in the area of the assembly openings.

In the embodiment shown, the supporting component 10 is configured of two half shells (FIG. 4). The partition plane 15 of the component 10 advantageously contains the longitudinal center axis of the housing 6. The partition plane 15 can simultaneously be the partition plane of the assembly openings 22 and 32. The assembly openings 22 and 32 are advantageously arranged at a short distance from the partition plane 15 (shown in dot-dash circles). They are made in a simple manner by drilling, in particular simultaneous drilling, in one component shell of the supporting component 10, or are formed by a core to be withdrawn during the manufacturing operation of the component 10. The component 10 can also be produced in one piece, for example, by the core melt-out process.

The venting component 40 is located at the highest point of the hollow member 12 in the main working position of the cutoff machine in order to ensure that as little fuel as possible is entrained from the fuel tank 20 into the equalizing vessel 30 during pressure equalization. For the same reason, a throttle member 50 is located in the discharge channel 44 of the venting line 21. The throttle member includes an insert with an external thread whereby a throttle is formed.

In the main working position, the longitudinal axis 70 (FIG. 1) of the apparatus lies at an acute angle 71 of approximately 40° to 80° to the horizontal material to be cut, for example, a floor plate. In this main working position, the stub 25 of the venting component 40 is located at the highest point of the fuel tank 20. This ensures that even with a full tank 20, the stub 25 opens into an air space, so that at the time of equalizing operations, predominantly air and no fuel passes into the equalizing vessel 30. The equalizing vessel 30 is advantageously located on the side of the fuel tank 20 remote from the cutoff disc 2.

When there is overpressure in the fuel tank 20, an equalizing flow in the direction of arrow 51 takes place from the fuel tank 20 into the equalizing vessel 30. Since the tube segment 47 opens in the bottom region 37 of the equalizing vessel, entrained fuel particles settle in the bottom region 37. The overpressure built up in the equalizing vessel 30 because of the flow in the direction of arrow 51 leads initially to a closing of the opening 39 of the duckbill valve 48 which consists of an elastic material. Only when the overpressure in the equalizing vessel exceeds a predetermined threshold value, does the valve member of the mushroom valve 49 lift and open the venting opening 38, so that the overpressure can decrease. A cap 29 is fitted on the venting component 40 to protect against contamination of the mushroom valve 49 in the interior of the cap 29. The overpressure can decay into the atmosphere via openings 28. An air-permeable cover of foam or sintered material can also be used in lieu of a cap 29 and openings 28.

If an underpressure occurs while the engine is running because of removal of fuel, then air is drawn by suction from the equalizing vessel 30 in the direction of arrow 52. The underpressure building up in the equalizing vessel 30 is reduced by air flowing via the duckbill valve 48. The inflowing air passes via the openings 28 into the space below the cap 29 and from there via the intake opening 27 lying in the center of the valve member of the mushroom valve 49, to the duckbill and from the valve opening 39 into the equalizing vessel 30. The pass-through openings 28 are kept small and ensure that no larger particles of dirt can pass via the duckbill valve 48 into the equalizing vessel.

With a repeated reduction of overpressure in the fuel tank 20, fuel deposits in the bottom region 37 of the equalizing vessel 30. If so much fuel has deposited that the level rises above the opening of the tube segment 47, then fuel is drawn by suction with the equalizing air from the equalizing vessel in the direction of arrow 52 into the fuel tank 20 at the time of equalization of the underpressure in the fuel tank 20. The system ensures that only a minimum of fuel is possible in the equalizing vessel 30 so that only a minimum, limited quantity of fuel can escape if the cutoff machine is held in a position which is not suitable for operation. An escape of fuel is largely precluded in permissible operating positions.

The venting component 40 lies centrally along the longitudinal axis of the housing and the equalizing vessel extends from one longitudinal side of the component 10 to the other longitudinal side thereof. For this reason, a fuel collecting space is also provided in a side position and lies below the assembly opening 32. A greater quantity of fuel must therefore be present in the equalizing vessel 30 before fuel can flow into the venting component and therefore escape.

A flange is preferably configured in one piece on the boundary wall of the hollow member 12 facing the interior space 16. This flange extends at right angles to the longitudinal center axis and serves as an attachment flange for the carburetor 5. The carburetor 5 is attached to the side of the flange remote from the internal combustion engine 1. An intake pipe section of resilient rubber material is fastened on the side of the flange facing the engine 1. This intake pipe section connects to the inlet channel 4 of the cylinder.

It is understood that the foregoing description is that of the preferred embodiments of the invention and that various changes and modifications may be made thereto without departing from the spirit and scope of the invention as defined in the appended claims.

What is claimed is:

1. A handheld portable work apparatus such as a cutoff machine or the like, the work apparatus comprising:

a housing;

a tool mounted on said housing;

an internal combustion engine mounted in said housing for driving said tool;

said housing having a supporting component defining a hollow body having a partitioning wall separating said hollow body into a first chamber defining a fuel tank and a second chamber defining a compensating vessel;

said engine being connected to said fuel tank from which fuel is supplied to said engine;

a one-piece venting component defining a venting line interconnecting said compensating vessel and said fuel tank for accommodating both underpressure and overpressure in said fuel tank;

said hollow body having an outer wall and said outer wall and said partition wall conjointly defining said chambers;

said outer wall having first and second assembly openings formed therein for communicating with said compensating vessel and said fuel tank, respectively;

said one-piece venting component being mounted on said outer wall so as to be accommodated in both of said first and second assembly openings; and, a valve system connecting said compensating vessel to the ambient atmosphere.

2. A handheld portable work apparatus such as a cutoff machine or the like, the work apparatus comprising:

a housing;

a tool mounted on said housing;

an internal combustion engine mounted in said housing for driving said tool;

said housing having a supporting component defining a hollow body having a partitioning wall separating said hollow body into a first chamber defining a fuel tank and a second chamber defining a compensating vessel;

said engine being connected to said fuel tank from which fuel is supplied to said engine;

a one-piece venting component defining a venting line interconnecting said compensating vessel and said fuel tank;

a valve system connecting said compensating vessel to the ambient atmosphere;

said hollow body having an outer wall and said outer wall and said partition wall conjointly defining said chambers;

said venting component being mounted on said outer wall;

said housing having an interior space and said outer wall having a wall portion facing toward said interior space;

said outer wall having first and second mutually adjacent apertures formed therein for communicating with said compensating vessel and said fuel tank, respectively;

said valve system being mounted in said first aperture and said venting component being mounted in said second aperture; and, said venting line of said venting component communicating with said fuel tank through said second aperture and extending through said first aperture to communicate with said compensating chamber.

3. The work apparatus of claim 2, said valve system being built into said venting component.

4. The work apparatus of claim 3, said venting component having first and second stubs projecting into and through said first and second apertures, respectively.

5. The work apparatus of claim 4, said first stub having a first channel section formed therein defining a portion of said venting line and a bore for accommodating said valve system.

6. The work apparatus of claim 5, said first and second stubs being provided with first and second sealing collars, respectively, and said sealing collars being fitted into corresponding ones of said apertures for sealing said stubs with respect to said wall portion.

7. The work apparatus of claim 6, further comprising a flat seal interposed between said wall portion and said valve component; and, said first and second sealing collars being formed as an integral part of said flat seal.

8. The work apparatus of claim 7, said first and second sealing collars being snapped into said first and second apertures, respectively, said stubs having respective beads formed thereon for engaging behind corresponding ones of said collars from within said chambers, respectively.

9. The work apparatus of claim 8, said first and second chambers having first and second volumes different from each other.

10. The work apparatus of claim 9, said second volume being greater than said first volume.

11. The work apparatus of claim 9, said supporting component defining a longitudinal axis and a partition plane containing said axis.

12. The work apparatus of claim 11, said supporting component being a die casting.

13. The work apparatus of claim 12, said die casting being a magnesium casting.

14. The work apparatus of claim 2, said venting component being an injected molded part.

15. The work apparatus of claim 14, said injected molded part being made of plastic.

16. The work apparatus of claim 1, said venting component being mounted in a region of said fuel tank facing away from said tool.

17. The work apparatus of claim 1, wherein said one-piece venting component is a single one-piece venting component and said venting line is a single venting line.

* * * * *